United States Patent
Levi

(10) Patent No.: US 10,501,022 B1
(45) Date of Patent: Dec. 10, 2019

(54) FOOT ACTUATED LADDER LATCHING DEVICE FOR A TILTING TYPE LADDER RACK

(71) Applicant: ROM ACQUISITION CORPORATION, Belton, MO (US)

(72) Inventor: Avraham Y. Levi, Eagan, MN (US)

(73) Assignee: ROM Acquisition Corporation, Belton, MO (US)

( * ) Notice: Subject to any disclaimer, the term of this patent is extended or adjusted under 35 U.S.C. 154(b) by 0 days.

(21) Appl. No.: 16/054,069

(22) Filed: Aug. 3, 2018

(51) Int. Cl.
| B60R 9/00 | (2006.01) |
| B60R 9/048 | (2006.01) |
| E06C 5/24 | (2006.01) |
| B60R 9/042 | (2006.01) |

(52) U.S. Cl.
CPC .......... *B60R 9/0485* (2013.01); *B60R 9/0423* (2013.01); *E06C 5/24* (2013.01)

(58) Field of Classification Search
CPC ........ B60R 9/0485; B60R 9/0423; E06C 5/24
USPC .......................................................... 224/324
See application file for complete search history.

(56) References Cited

U.S. PATENT DOCUMENTS

| | | | | |
|---|---|---|---|---|
| 1,260,560 A * | 3/1918 | Longenecker | ............ | B60P 1/32 298/14 |
| 3,193,124 A * | 7/1965 | Essling | ................. | B60P 3/1025 414/462 |
| 3,471,045 A * | 10/1969 | Panciocco | ................. | B60P 1/32 414/522 |
| 3,768,673 A * | 10/1973 | Nydam | ...................... | B60P 1/00 414/522 |
| 3,843,001 A * | 10/1974 | Willis | ...................... | B60P 3/122 414/462 |
| 4,348,054 A * | 9/1982 | Shonkwiler | .......... | B62D 53/062 298/11 |
| 5,423,650 A * | 6/1995 | Zerbst | ..................... | B60R 9/042 224/310 |
| 5,454,684 A * | 10/1995 | Berens | ...................... | B60P 1/04 296/26.1 |
| 7,513,730 B2 * | 4/2009 | Goyanko | ................ | B60R 9/042 224/310 |
| 8,215,893 B2 * | 7/2012 | Simpson | ................. | B60P 3/122 414/462 |
| 9,526,932 B1 * | 12/2016 | Ziaylek | ................... | A62C 27/00 |
| 2006/0076189 A1 * | 4/2006 | Ziaylek | ................. | B60R 9/0423 182/127 |
| 2007/0240936 A1 * | 10/2007 | Brookshire, Jr. | ......... | E06C 5/04 182/127 |

(Continued)

*Primary Examiner* — Peter N Helvey
(74) *Attorney, Agent, or Firm* — Dewitt LLP; Thomas J. Nikolai

(57) ABSTRACT

A ladder latching device for a tilting ladder rack includes an inner extrusion for clamping to the load supporting member of the ladder rack. An outer extrusion is slidably mounted on the inner extrusion. The outer extrusion carries a treadle and ladder rung engaging stop. Between the two extrusions are a toothed rack and a gas spring. The outer extrusion carries a pivotable, spring-biased lever having a tooth for selectively engaging the toothed rack for releasably locking the stop at a desired location relative to a rung of a ladder being unloaded as the outer extrusion is made to slide by applying foot pressure on the treadle. Thus, a ladder may be lowered along the load supporting member until the ladder's feet engage the ground as the stop disengages from its place on a ladder rung.

9 Claims, 7 Drawing Sheets

(56) References Cited

U.S. PATENT DOCUMENTS

| | | | |
|---|---|---|---|
| 2011/0038698 A1* | 2/2011 | Li | B60P 3/14 |
| | | | 414/479 |
| 2012/0263561 A1* | 10/2012 | Li | B60R 9/0423 |
| | | | 414/462 |
| 2015/0125245 A1* | 5/2015 | Gallagher | B60R 9/042 |
| | | | 414/462 |
| 2018/0257578 A1 | 9/2018 | Levi | |

* cited by examiner

FOOT ACTUATED LADDER LATCHING DEVICE FOR A TILTING TYPE LADDER RACK

CROSS-REFERENCED TO RELATED APPLICATION

Not applicable

STATEMENT REGARDING FEDERALLY SPONSORED RESEARCH OR DEVELOPMENT

Not applicable

BACKGROUND OF THE INVENTION

I. Field of the Invention

The present invention relates generally to vehicle-mounted ladder racks and, more particularly, to an attachment for releasably securing a ladder to the load support member of a tiltable ladder rack that facilitates the loading and unloading of a ladder onto and from the load support member.

II. Discussion of the Prior Art

A wide variety of types of vehicle ladder racks are known in the art for transporting ladders to and from a work location. There are stationary racks that mount on a vehicle and they vary somewhat dependent on the type of vehicle involved. There are stationary racks of a welded construction that are affixed to the vehicle to support one or more ladders that are bound to the rack structure to prevent shifting of the ladders during transit. There are also movable ladder racks, such as are described in my earlier U.S. Pat. Nos. 5,297,912; 6,092,972; 6,099,231; 6,427,889; 6,764,268; 6,971,563; 8,511,525; 8,857,689; 8,991,889; 9,415,726; 9,481,313; 9,481,314; and 9,506,292.

For the most part, the ladder racks involved in these patents, as well as others in the prior art, have utilized a lever to simultaneously rotate front and rear 4-bar linkages to transfer ladders from a position atop a work vehicle to a location along the side of the vehicle where a worker can readily grasp the ladder and carry it to a work site.

In currently pending application Ser. No. 15/919,749, filed Mar. 13, 2018, the contents of which are hereby incorporated by reference as if set forth in full herein, there is described a ladder rack assembly for a work vehicle that has a stationary bed for attachment to the roof of the vehicle where the stationary bed comprises a pair of parallel, spaced-apart rails. Affixed to the rails are guide members that extend from the rails' front ends toward, but short of their rear ends where "front" and "rear" are with respect to the vehicle on which the rack is mounted. Rollers on side edges of a load support member ride on the bed rails. When the rollers are constrained by the guides, only translation of the load support member takes place. Upon exit of the rollers from the rear ends of the guides, both translation and rotation of the load support member can occur. A control arm is pivotally joined at one end to the stationary bed toward its rear end. The other end of the control arm has cam actuated latch pin assemblies attached that co-act with cams on the stationary bed during rearward displacement of the load support member to thereby latch the load support member to the control arm. Once so joined, further rearward movement of the load support member causes it to rise up and ultimately come to rest at a position somewhat inclined to the vertical at the rear end of the work vehicle.

The present invention is a recent improvement designed for use on what I have referred to as a "tiltable ladder rack" described in the aforementioned pending application. Because the load support member must clear the rear bumper of the work vehicle, while the stationary bed is not made to project beyond the rear roof line of the vehicle, the load support member cannot be perfectly vertical, but instead is inclined somewhat so as to lean toward the vehicle when in its unload/load position at the rear of the vehicle. This has made it necessary for a worker to extend his or her arms straight out from the shoulder while, at the same time, lifting the ladder so that its lower rung can clear an L-shaped stop needed to prevent shifting of the ladder load during transit. The need to lift a typical ladder with the arms fully extended forward from the shoulders puts an undue strain on the worker's back. It is the purpose of the present invention to provide an ergonomic solution to this problem.

As will be described in greater detail in this specification, the present invention allows a ladder to be loaded and unloaded where initially the ladder can have its feet resting on the ground so it is only necessary to rotate the ladder about its feet to a vertical carrying position, but without the need to simultaneously lift the ladder while doing so. Thus, back strain injuries can be avoided.

SUMMARY OF THE INVENTION

The present invention comprises a ladder latching mechanism for a tilting type ladder rack of the type described in the aforereferenced pending application that comprises a first elongate extrusion of a rectangular cross-section that is adapted to be affixed to the load support member of a tilting type ladder rack proximate its rearward end. A second elongate extrusion is mounted on the first extrusion for sliding movement there along.

An L-shaped stop is affixed to the second elongate extrusion with a first leg of the L clamped to a gusset and projecting perpendicular to the second elongate extrusion and the second leg of the L being spaced from and generally parallel to the second elongated extension. This L-shaped stop is adapted to engage a lower rung of a ladder when the ladder is being carried on the load support member.

A treadle member is also clamped to the second elongate extrusion allowing the worker's leg and foot to slide and displace the second elongate extrusion with its L-shaped stop along the first elongated extrusion. A gear rack is affixed to and disposed within the first elongate extrusion, the rack having a plurality of regularly spaced teeth along the length thereof. A spring-biased lever is pivotally joined to the second elongate extrusion. The lever carries a tooth at a first end thereof that is adapted to cooperate with the regularly spaced teeth of the gear rack for latching the second elongate extrusion to the first elongated extrusion with the L-shaped stop at a desired location. The spring-biased lever has a lever arm located adjacent to the treadle member and which, when depressed by an operator's foot, will overcome the spring force of the spring-biased lever to disengage the tooth carried by the spring-biased lever from the teeth of the gear rack to permit the second elongated extrusion to slide along the first elongated extrusion to the point where a ladder's feet will come to rest on the ground while the L-shaped stop will no longer engage a ladder rung.

The present invention further includes a gas spring that is operatively coupled between the first and second elongate extrusions so that, as an operator steps down on the treadle to displace the second extrusion along the length of the first extrusion, potential energy is stored in the gas spring to be released upon a reloading of a ladder onto the load support member and the load support member elevated to the roof of the vehicle.

BRIEF DESCRIPTION OF THE DRAWINGS

The foregoing features, objects and advantages of the invention will become apparent to those skilled in the art from the following detailed description of the preferred embodiment, especially when considered in conjunction with the accompanying drawings in which like numerals in the several views refer to corresponding parts.

DESCRIPTION OF THE PREFERRED EMBODIMENT

Figure 1:
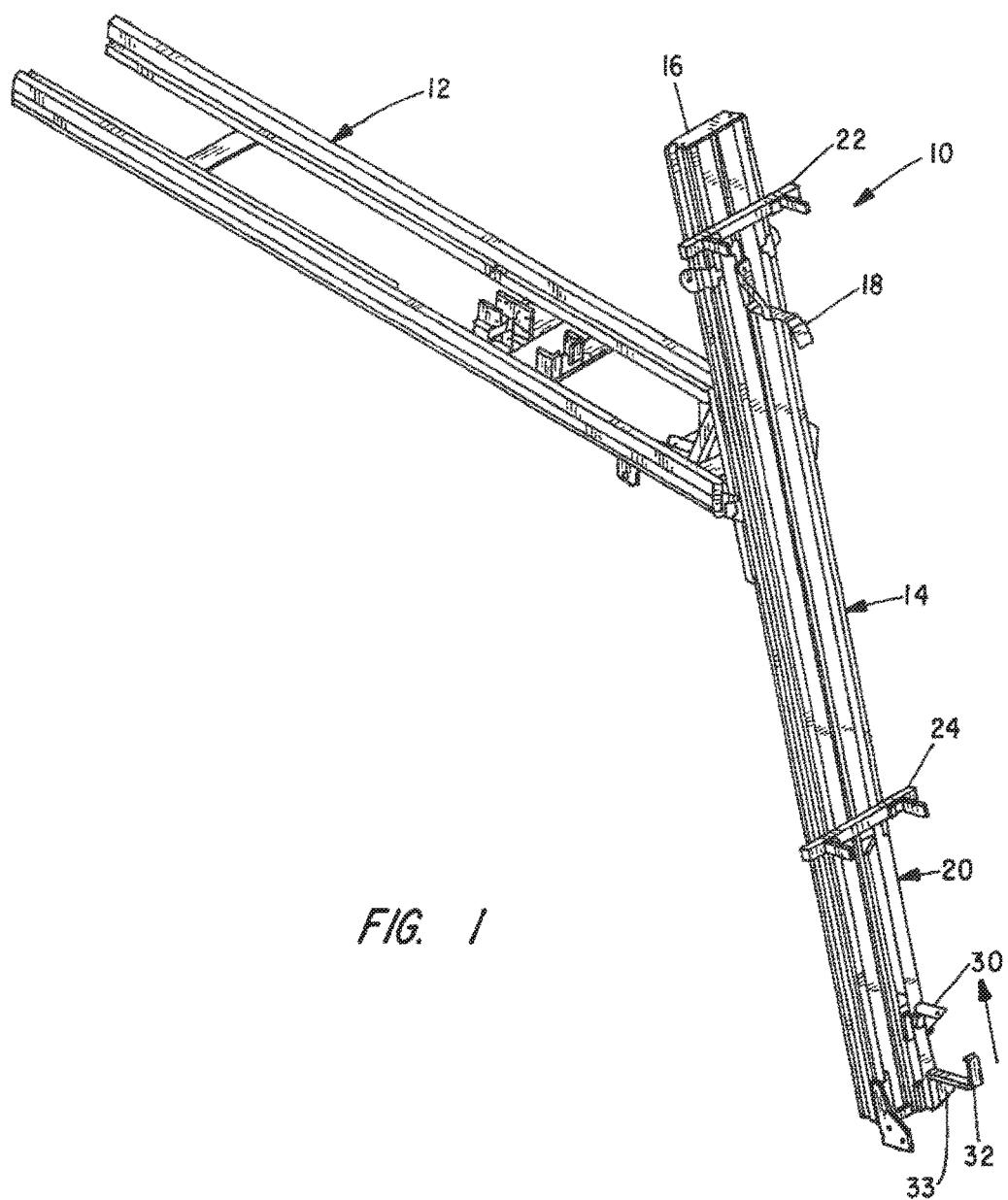
FIG. 1 is a perspective view of a tiltable ladder rack with the foot actuated ladder latching device of the present invention installed thereon.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise. The term "tilting ladder rack" as used herein means the type of ladder rack shown and described in pending U.S. patent application Ser. No. 15/919,749 where ladders are loaded and unloaded from the rear of a work vehicle. "Forward" and "rearward" are with respect to the vehicle on which the tilting ladder rack is mounted.

Referring to FIG. 1, there is indicated generally by numeral 10 a tilting type ladder rack on which the present invention finds use. It comprises a stationary base 12 that is clamped to the roof of a work vehicle and that extends along the length dimension of the vehicle. Pivotally joined to the stationary base 12 and slidable thereon is a load support member 14. Clamped to the load support member 14 proximate its forward end 16 is a stationary, L-shaped ladder stop 18 adapted to abut a selected ladder rung when the ladder is placed on the load support member 14 and moved against it. The stationary ladder stop 18 is height-adjustable and is designed to prevent a ladder from moving forward and/or upward, such as may result from sudden braking of the vehicle.

The ladder latch assembly comprising the preferred embodiment of the present invention is identified generally by numeral 20 and is clamped to the load support member 14 proximate its rearward end. Also clamped to the pair of extrusions comprising the load support member 14 are front and rear stabilizers 22 and 24 which span the length of the ladder rungs to engage the ladder rails to thereby prevent lateral shifting of the ladder with respect to the load support member during vehicle travel.

Figure 2:
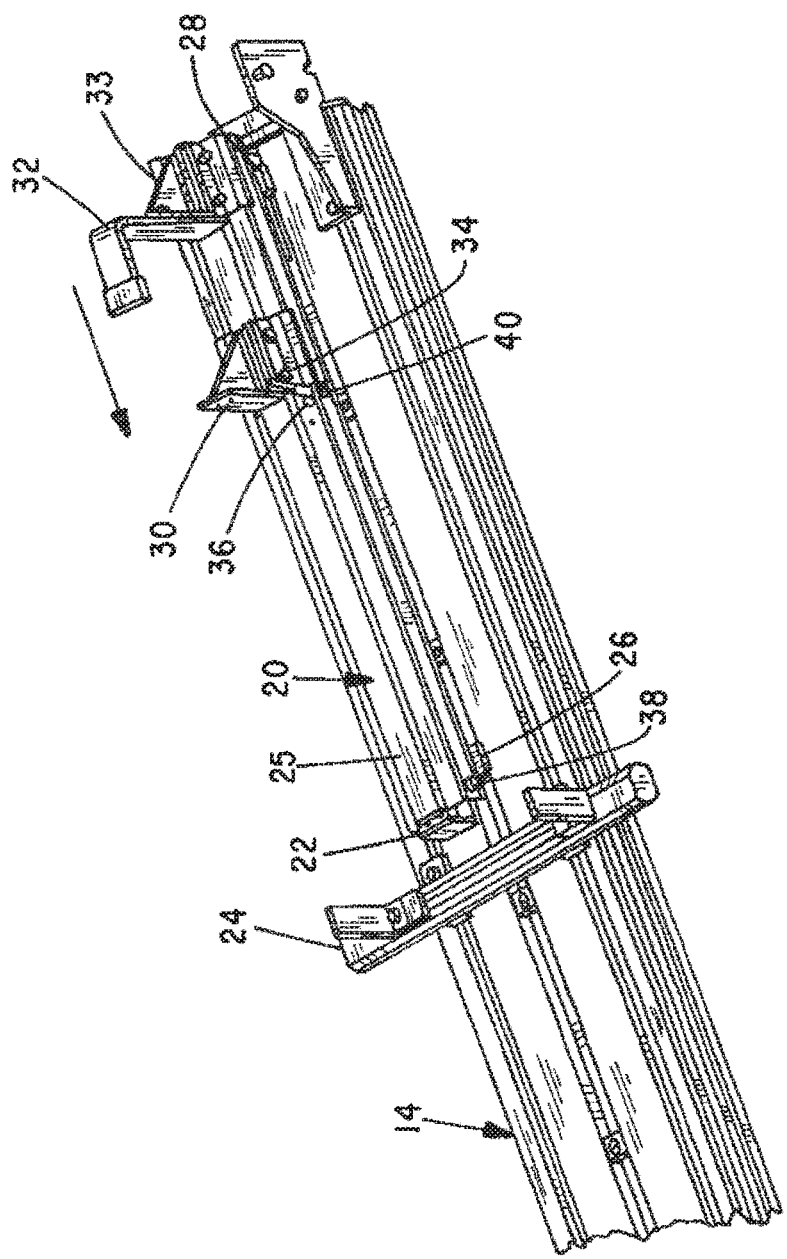
FIG. 2 is a partial perspective view showing the latching mechanism of the present invention mounted to a load support member of a tilting ladder rack when in its ladder latching position.

FIG. 2 is an enlarged partial perspective view of the load support member 14 on which the latching assembly 20 of the present invention is affixed. It is seen to include a stationary inner extrusion 22 that is just barely visible in FIG. 2 extending beyond a forward end of an outer extrusion 25. The inner extrusion is clamped to the load support member 14 by clamps 26 and 28.

Clamped to the exterior surface of the outer extrusion 24 are a treadle 30 and an L-shaped stop 32, where the L-shaped stop 32 is adapted to engage a selected ladder rung located toward the foot end of a ladder as the ladder is being loaded onto the load support member 14 and while the ladder rack is in its ladder transport location atop the work vehicle. More particularly, a gusset member 33 is clamped to the outer extrusion and the L-shaped stop is bolted to the gusset through a slot in the gusset so that the stop can be raised or lowered as needed to co-act with a ladder rung. As best seen in FIG. 1, a ladder may be captured between the pair of L-shaped stops 32 and 18 as they engage ladder rungs toward the top and bottom of a ladder being transported. This prevents a ladder being carried from shifting due to acceleration and braking of the work vehicle during transit.

Also seen in FIG. 2 is a lever arm 34 that projects up through an opening 36 formed through the top surface of the outer extrusion 24 and closely adjacent to the treadle 30.

Figure 3:
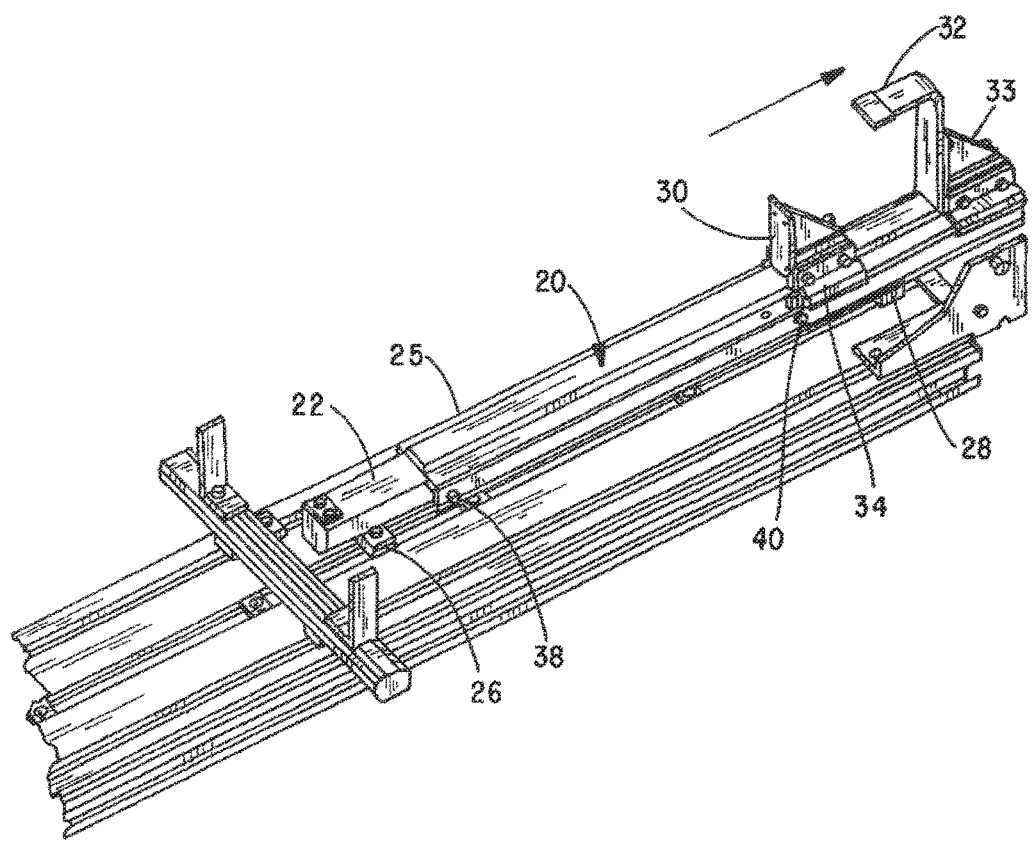
FIG. 3 is a view like that of FIG. 2, but with the latching mechanism in its released position.

By comparing FIGS. 2 and 3, it can be seen that the outer extrusion 25 is designed to slide longitudinally with respect to the stationary inner extrusion 22. While not shown in the drawings, nylon bearings are affixed to the inner side wall of the outer extrusion 25 by screws, as at 38 and 40, to facilitate the ability of the outer extrusion 25 to slide without binding on the inner extrusion 22.

Figure 4:
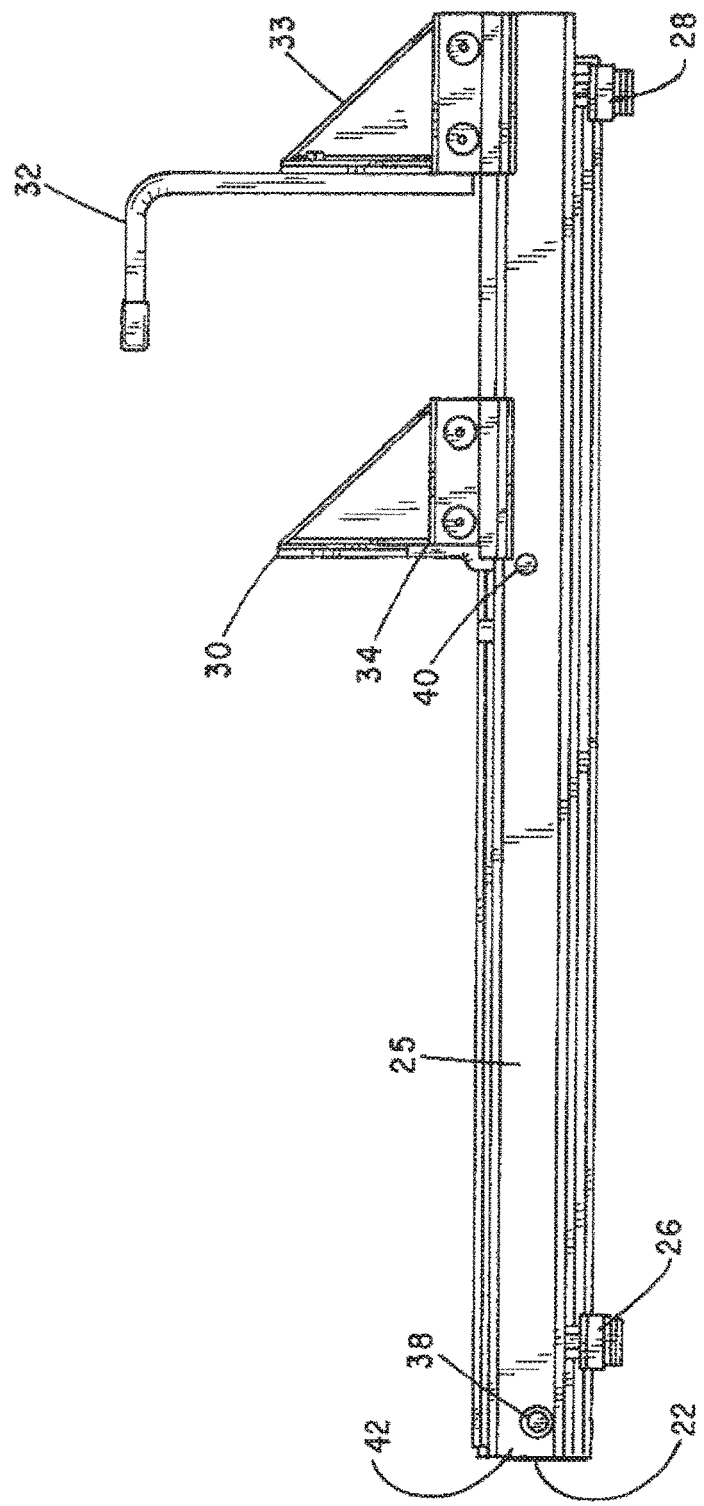
FIG. 4 is a side elevational view of the foot actuated ladder latching mechanism when in its ladder latching position.
Figure 5:
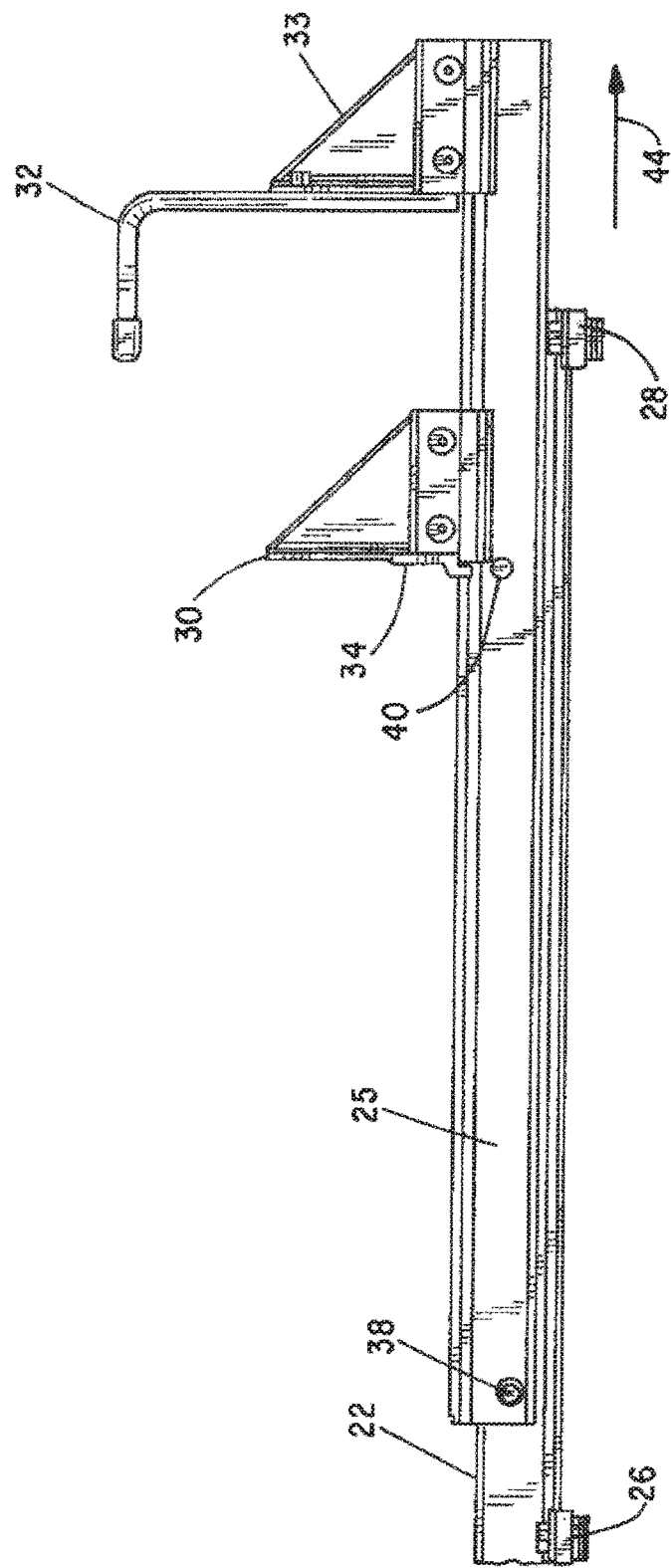
FIG. 5 is a view like that of FIG. 4, but with the latching mechanism in its released position.

Next, comparing FIG. 4 to FIG. 5, it can be seen that in FIG. 4 the outer extrusion 25 is in its extreme forward position such that the inner extrusion 22 is just barely visible out from the forward end 42 of the outer extrusion 25. By referring to FIG. 1, it can be seen then that, in this position, an upper rung of a ladder will be captured by the L-shaped stop 18 while a lower rung of the ladder will be captured by the L-shaped stop 32. In FIG. 5, however, the outer extrusion 25 has been shifted in the direction of the arrow 44, upon the worker stepping down on the treadle 30, when the load support member 14 is inclined with respect to its stationary bed 12 to a point where the feet of a ladder carried on the load support member come to rest on the ground behind the vehicle. Now, the upper and lower L-shaped stops 18 and 32 will no longer engage their respective rungs. This allows a worker to simply rotate the ladder about its feet to a vertical orientation and allowing it to be lifted and carried away without the need to lift the ladder while in an inclined condition so as to clear its upper and lower rung stops 18 and 32.

Figure 6:
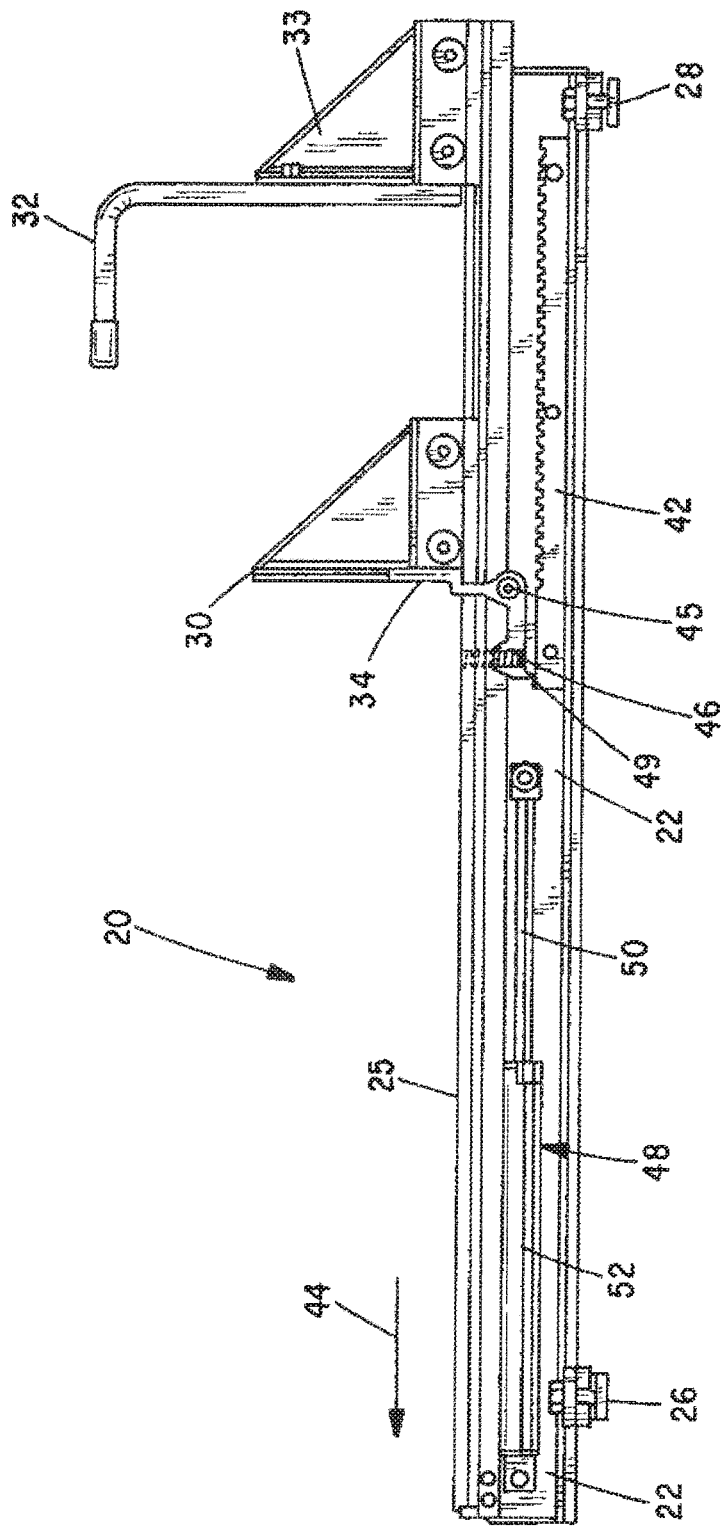
FIG. 6 is a sectioned side view of the foot actuated ladder latching device when in its latched condition.
Figure 7:
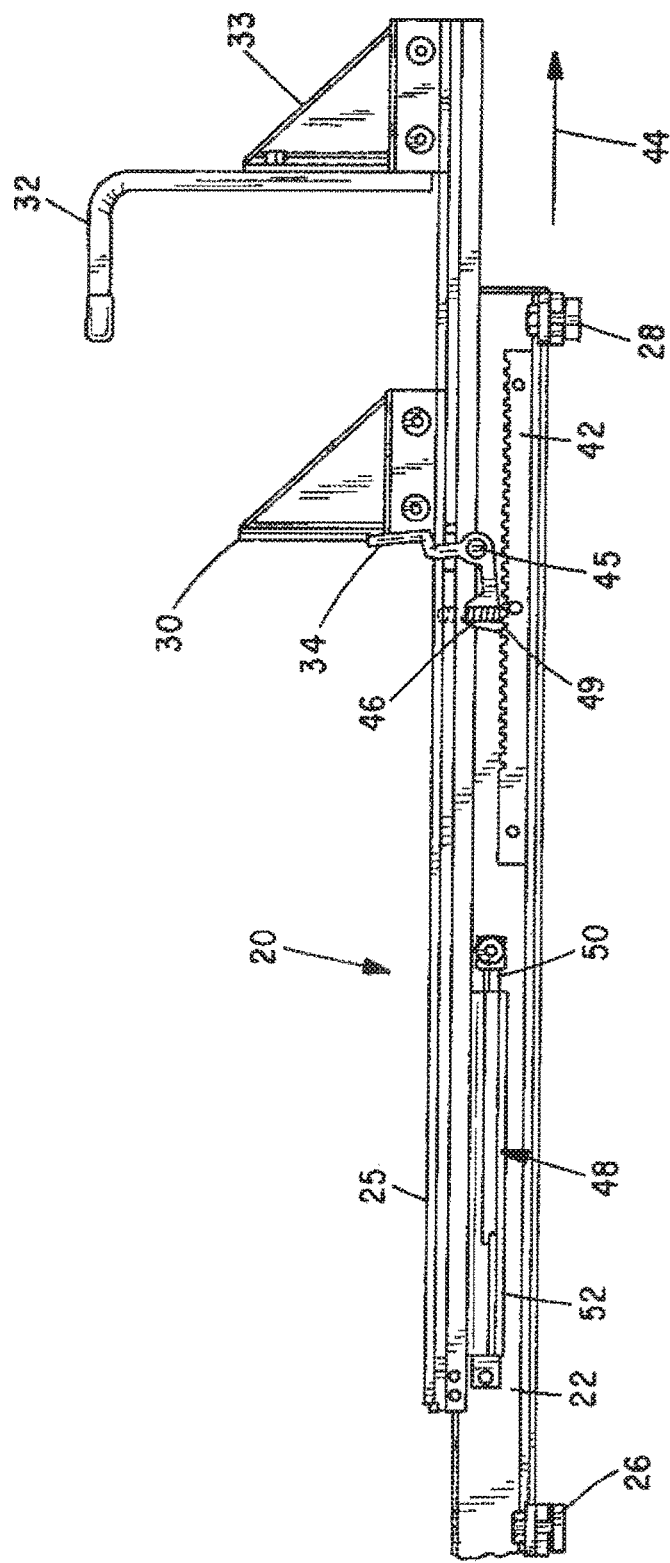
FIG. 7 is a view like that of FIG. 6, but with the foot actuated ladder latching device in its released position.

FIGS. 6 and 7 are cross-sectional side views of the latching mechanism 20 showing the internal construction thereof. FIG. 6 shows the latching mechanism 20 in its ladder-latching position while FIG. 7 shows it in its unlatched position. Located within the inner extrusion and fixedly attached thereto is a toothed rack 42 and cooperating therewith is the lever 34 that is generally L-shaped and pivotally mounted to the outer extrusion by a hinge pin 44. The lever 34 is spring-biased against the rack 42 by a compression spring 46.

A conventional gas spring 48 has its piston rod 50 connected with an underside of the inner extrusion 22 and its cylinder 52 joined to the outer extrusion 25. It should be apparent to those skilled in the art that, when the tilting ladder rack 10 is in its inclined loading and unloading position relative to the vehicle as illustrated in FIG. 1, and a ladder is to be unloaded from the rack 10, the ladder will be clamped between the rung stop members 18 and 32. Now, a worker may place his or her foot on the treadle 30 and by stepping down, it will cause the outer extrusion 25 carrying the L-shaped stop member 32 to descend and, in doing so, a tooth 48 on the lever 34 will "click" along the rack 42 until a point is reached where the ladder's feet will engage the ground and the ladder's rungs will no longer be captured by the upper stop 18 and the lower stop 32. When so located, the ladder may now be pulled to a vertical orientation where it can easily be lifted clear of the ladder rack assembly.

As the treadle 30 is being depressed by the worker's foot to force the outer extrusion 25 to slide along the inner extrusion 22, the gas within the gas spring 48 will be compressed to store energy. Now, when the worker returns from the work site and wishes to reload the ladder onto the work vehicle, he or she will position the ladder so that its feet are on the ground and a lower rung of the ladder will be located directly above the L-shaped stop 32 and an upper rung of the ladder is aligned with the upper L-shaped stop 18. Now, by pressing down on the lever 34 with a foot, the force of the compression spring 46 will be overcome raising the tooth 48 from the rack 42 and allowing the worker to slide the ladder upward along the load support member 14 with the aid of the force supplied by the gas spring to elevate the ladder to its latched condition relative to the load support member of the tilting ladder rack 10 eliminating the operator's back stress caused when reaching out and using arm muscle strength to lift the ladder onto the carrier.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A ladder latching mechanism for a tilting type ladder rack comprising, in combination:
   a) a first elongate extrusion adapted to be fixedly attached to a load support member of a tilting type ladder rack at a rearward end of the load support member;
   b) a second elongate extrusion mounted on the first extrusion for sliding movement there along;
   c) an L-shaped stop having a first leg clamped to and projecting out from the second elongate extrusion and a second leg spaced from and aligned with the second elongate extrusion, said L-shaped stop adapted to engage a lower rung of a ladder carried on the load support member;
   d) a treadle member clamped to the second elongate extrusion;
   e) a toothed gear rack affixed to and disposed within the first elongate extrusion; and
   f) a spring-biased lever pivotally joined to the second elongate extrusion, the lever carrying a tooth at a first end thereof adapted to cooperate with teeth of the gear rack for latching the second elongate extrusion to the first elongate extrusion with the L-shaped stop at a desired location, the spring-biased lever having a lever arm separate from, but adjacent to, the treadle member which when depressed with a predetermined force will overcome a spring of the spring-biased lever to disengage the tooth carried by the spring-biased lever from teeth of the gear rack to permit the second elongate extrusion to slide along the first elongate extrusion.

2. The ladder latching mechanism of claim 1 and further including a gas spring operatively coupled between the first and second elongate extrusions.

3. The ladder latching mechanism of claim 1 wherein the space between the second leg of the L-shaped stop and the second elongate extrusion is adjustable.

4. The ladder latching mechanism of claim 1 wherein the first and second elongate extrusions are of a rectangular cross-section.

5. The ladder latching mechanism of claim 2 wherein potential energy is stored in the gas spring upon depression of the treadle and recovered following actuation of the spring-biased lever.

6. A ladder latching mechanism for a tilting type ladder rack comprising, in combination:
   a) a first elongate extrusion adapted to be fixedly attached to a load support member of a tilting type ladder rack at a rearward end of the load support member;
   b) a second elongate extrusion mounted on the first extrusion for sliding movement there along;
   c) a stop clamped to and projecting out from the second elongate extrusion, the stop adapted to engage a lower rung of a ladder carried on the load support member;
   d) a spring-biased lever having first and second lever arms and pivotally joined to the second elongate extrusion for latching the second elongate extrusion to the first elongate extrusion with the stop at a desired location, which when the first lever arm is depressed with a predetermined force will permit the second elongate extrusion to slide along the first elongate extrusion.

7. The ladder latching mechanism of claim 6 and further including:
   a treadle member joined to the second elongate extrusion.

8. The ladder latching mechanism of claim 7 and further including:
   a toothed gear rack affixed to and disposed within the first elongate extrusion.

9. The ladder latching mechanism of claim 8 wherein the spring-biased lever has its first lever arm separate from, but adjacent to, the treadle member and where the predetermined force applied to the first lever arm is sufficient to displace the second lever arm of the spring-biased lever from engagement with the toothed gear rack.

\* \* \* \* \*